United States Patent
Poothia et al.

(10) Patent No.: US 10,929,165 B2
(45) Date of Patent: Feb. 23, 2021

(54) SYSTEM AND METHOD FOR MEMORY RESIZING IN A VIRTUAL COMPUTING ENVIRONMENT

(71) Applicant: Nutanix, Inc., San Jose, CA (US)

(72) Inventors: Gaurav Poothia, Redmond, WA (US); Arun Navasivasakthivelsamy, San Jose, CA (US); Abhinay Nagpal, Fremont, CA (US); Miao Cui, New York, NY (US); Srinivas Bandi Ramesh Babu, Mountain View, CA (US); Weiheng Chen, Seattle, WA (US); Himanshu Shukla, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 205 days.

(21) Appl. No.: 16/051,242

(22) Filed: Jul. 31, 2018

(65) Prior Publication Data
US 2020/0042338 A1 Feb. 6, 2020

(51) Int. Cl.
*G06F 9/46* (2006.01)
*G06F 9/455* (2018.01)
(Continued)

(52) U.S. Cl.
CPC ........ *G06F 9/45558* (2013.01); *G06F 3/0604* (2013.01); *G06F 3/067* (2013.01);
(Continued)

(58) Field of Classification Search
CPC .. G06F 9/45558; G06F 3/0644; G06F 3/0604; G06F 3/067; G06F 12/023
See application file for complete search history.

(56) References Cited

U.S. PATENT DOCUMENTS 7,065,630 B1 * 6/2006 Ledebohm .......... G06F 12/1081
710/8
8,549,518 B1 10/2013 Aron et al.
(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.
(Continued)

*Primary Examiner* — Camquy Truong
(74) *Attorney, Agent, or Firm* — Foley & Lardner LLP

(57) ABSTRACT

A system and method for dynamically adjusting the amount of memory allocated to a virtual machine includes generating, by a memory resizing system, a current memory usage profile for the virtual machine. The memory resizing system and the virtual machine are part of a virtual computing system and the current memory usage profile is generated by mapping, as a function of time, memory usage information from the virtual machine. The system and method also include computing an upper baseline based upon a peak memory usage in the current memory profile, updating an initial memory allocation of the virtual machine based upon the upper baseline and a predetermined threshold for obtaining an initial revised memory allocation, determining a moving average of memory usage from a historical memory usage profile, and updating the initial revised memory allocation based upon the moving average of memory usage for obtaining a final revised memory allocation.

29 Claims, 7 Drawing Sheets

(51) Int. Cl.
  *G06F 12/02* (2006.01)
  *G06F 3/06* (2006.01)
(52) U.S. Cl.
  CPC .......... *G06F 3/0644* (2013.01); *G06F 12/023* (2013.01); *G06F 2009/45583* (2013.01)

(56) References Cited

U.S. PATENT DOCUMENTS

| | | | |
|---|---|---|---|
| 8,601,473 B1 | 12/2013 | Aron et al. | |
| 8,850,130 B1 | 9/2014 | Aron et al. | |
| 9,772,866 B1 | 9/2017 | Aron et al. | |
| 10,049,116 B1* | 8/2018 | Bajpai | G06F 11/1453 |
| 10,157,193 B2* | 12/2018 | Attaluri | G06F 16/27 |
| 10,228,864 B1* | 3/2019 | Zelenov | G06F 12/0862 |
| 2012/0137291 A1* | 5/2012 | Bacher | G06F 9/45558 718/1 |
| 2014/0013072 A1* | 1/2014 | Liu | G06F 9/5077 711/170 |
| 2014/0082612 A1* | 3/2014 | Breitgand | G06F 9/45533 718/1 |
| 2014/0237069 A1* | 8/2014 | Gray | G06F 3/061 709/214 |
| 2014/0237197 A1* | 8/2014 | Gray | G06F 3/061 711/153 |
| 2015/0095909 A1* | 4/2015 | Li | G06F 9/45558 718/1 |
| 2015/0142908 A1* | 5/2015 | Sun | G06F 9/45558 709/213 |
| 2019/0073580 A1* | 3/2019 | Dzhulgakov | G06N 3/0454 |

OTHER PUBLICATIONS

Calindas, Frederic. "Deep Dive into the vRealize Operations Capacity Management" (Nov. 26, 2018), from https://blogs.vmware.com/management/2018/11/deep-dive-into-the-vrealize-operations-capacity-management.html (retrieved Nov. 11, 2019).

MAGANDER3. "Nutanix AOS Version 5.5 & More Released" (Dec. 5, 2017) from https://vedx56.com/2017/12/nutanix-aos-version-5-5-more-released/ (retrieved Nov. 11, 2019).

NetApp Video Library "Are Workloads Resource Constrained" (Publish date unavailable) from https://tv.netapp.com/detail/video/1190033909001/are-workloads-resource-constrained (retrieved Nov. 11, 2019).

VMware Docs. "Example: Reclaiming Resources from Oversized Vms" (Apr. 24, 2018) from https://does.vmware.com/en/vRealize-Operations-Manager/6.7/com.vmware.vcom.user.doc/GUID-92FA68F8-1996-444E-A864-20018B51B728.html (retrieved Nov. 11, 2019).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR MEMORY RESIZING IN A VIRTUAL COMPUTING ENVIRONMENT

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some aspects of the present disclosure, a method is disclosed. The method includes generating, by a recommendation engine of a memory resizing system, a current memory usage profile for a virtual machine associated with the memory resizing system. The memory resizing system and the virtual machine are part of a virtual computing system and the current memory usage profile is generated by mapping, as a function of time, memory usage information from the virtual machine collected by agents of the memory resizing system. The method also includes computing, by the recommendation engine, an upper baseline based upon a peak memory usage in the current memory profile, updating, by the recommendation engine, an initial memory allocation of the virtual machine based upon the upper baseline and a predetermined threshold for obtaining an initial revised memory allocation, and determining, by the recommendation engine, a moving average of memory usage from a historical memory usage profile generated by the recommendation engine. The method further includes updating, by the recommendation engine, the initial revised memory allocation based upon the moving average of memory usage for obtaining a final revised memory allocation.

In accordance with some other aspects of the present disclosure, a system is disclosed. The system includes a memory resizing system associated with a virtual computing system. The memory resizing system includes an agent to collect memory usage information from a virtual machine of the virtual computing system and a recommendation engine to dynamically adjust an initial memory allocation of the virtual machine based upon the memory usage information. The recommendation engine includes a memory configured to store the memory usage information and a processing unit configured to generate a current memory usage profile by mapping, as a function of time, the memory usage information of the virtual machine, compute an upper baseline based upon a peak memory usage in the current memory profile, and update the initial memory allocation of the virtual machine based upon the upper baseline and a predetermined threshold for obtaining an initial revised memory allocation. The processor is also configured to determine a moving average of memory usage from a historical memory usage profile generated by the recommendation engine and update the initial revised memory allocation based upon the moving average of memory usage for obtaining a final revised memory allocation.

In accordance with yet other aspects of the present disclosure, a non-transitory computer readable media with computer-executable instructions embodied thereon is disclosed. The instructions when executed by a processor of a memory resizing system associated with a virtual computing system cause the memory resizing system to perform a process. The process includes generating a current memory usage profile for a virtual machine associated with the memory resizing system. The virtual machine is part of the virtual computing system and the current memory usage profile is generated by mapping, as a function of time, memory usage information from the virtual machine collected by agents of the memory resizing system. The process also includes computing an upper baseline based upon a peak memory usage in the current memory profile, updating an initial memory allocation of the virtual machine based upon the upper baseline and a predetermined threshold for obtaining an initial revised memory allocation, and determining a moving average of memory usage from a historical memory usage profile generated by the recommendation engine. The process further includes updating the initial revised memory allocation based upon the moving average of memory usage for obtaining a final revised memory allocation.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
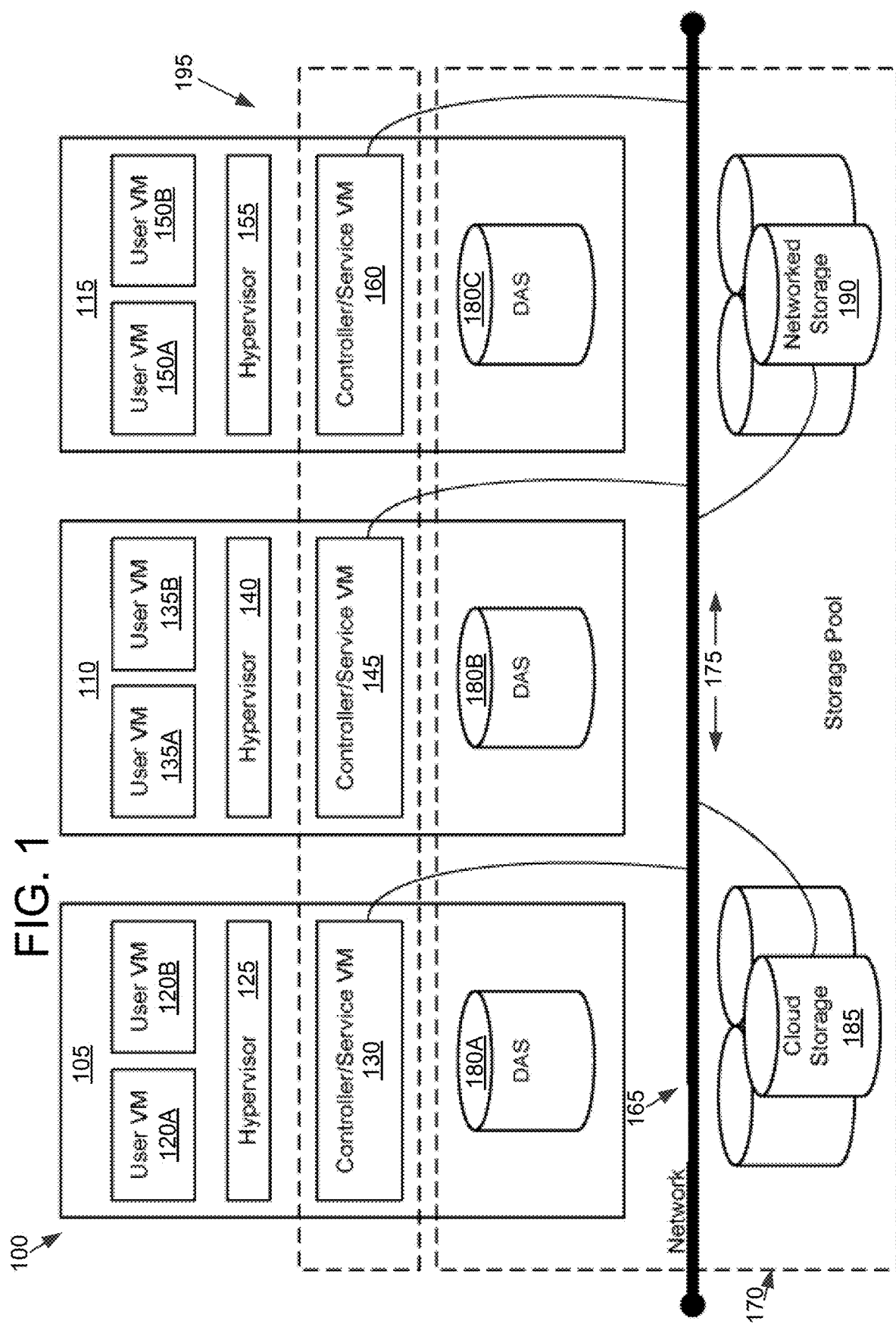
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a virtual machine monitor such as a hypervisor. These and other components of the virtual computing system may be part of a datacenter and may be managed by a user (e.g., an administrator or other authorized personnel). Each node is assigned a set of resources, which are shared and used by the virtual machines on that node. Such resources may include processing power, memory, electrical power, network connections, and any other physical or virtual component that is available in limited supply and that a virtual machine may need/use in performing/running a workload. The hypervisor manages the assignment and scheduling of the various resources to the virtual machines on the underlying node.

In terms of memory, each node may be assigned a fixed amount of memory that is shared amongst the various virtual machines on that node. This fixed amount of memory, termed as host memory, is a Random Access Memory ("RAM"). The hypervisor allocates the host memory to the various virtual machines. Thus, each virtual machine has a fixed amount of physical RAM memory, also referred to as initial memory allocation. Typically, the hypervisor overcommits the host memory. In other words, the hypervisor assigns the host memory such that a total of the amount of memory assigned to each of the virtual machines on a node is greater than the total amount of host memory assigned to that node. As an example, if the host memory of a node is 10 GB, the hypervisor may assign each of four virtual machines on that node 3 GB each, such that the total amount of memory assigned to the four virtual machines is 12 GB (4 virtual machines times 3 GB on each virtual machine), which is greater than the host memory of 10 GB. Such overcommitting of memory is called "over provisioning."

Since all of the virtual machines are generally unlikely to use their respective memory (e.g., 3 GB in the example above) at the same time, over provisioning of memory does not generally cause problems. However, even in such cases, the memory assigned to a particular virtual machine may be insufficient for the workload(s) being run on that virtual machine. In other words, the virtual machine may need more memory than what it is assigned thereto. A virtual machine that needs more memory than allocated thereto is called "constrained" for memory. In such cases, the virtual machine resorts to one or more memory compensating techniques to make up for the memory deficiency. For example and continuing the example above, if a particular virtual machine that is assigned 3 GB actually needs 5 GB memory to run a workload, that virtual machine may invoke one or more memory compensating techniques to make up for the 2 GB memory deficiency.

In other cases, all of the virtual machines indeed use their respectively assigned physical RAM memory at the same time. In these instances, since the total amount of memory being consumed by the virtual machines is greater than the assigned host memory, various memory compensating techniques may need to be employed. For example and continuing with the example above, when all of the virtual machines are consuming their respectively assigned memory, the total amount of memory being consumed on the node is 12 GB. However, the amount of memory available to that node is only 10 GB.

The memory compensating techniques that may be employed may include, for example, page faults, memory ballooning, in gust memory swap, host level memory swap, etc. A page fault occurs when a workload (also referred to herein as a process, program, application, and the like) running on a virtual machine attempts to access data or code that is not found within the virtual address space or the RAM of that virtual machine. The workload raises an interrupt to the underlying guest Operating System ("guest OS") of the virtual machine, which then accesses the required data or code from the storage (e.g., from the non-volatile memory space) and adds that data or code to the RAM for use by the workload. The time spent by the workload in determining that the data or code is not available in the RAM, raising the interrupt, and waiting for the guest OS to locate and load that data or code in the RAM adversely impacts the performance of that workload, and ultimately the performance and operation of the underlying virtual machine. In some cases, the guest OS may decide to simply terminate that workload.

Another memory compensating technique is memory ballooning, which is generally used when a virtual machine needs more memory than it has. In such cases, the virtual machine borrows unused memory previously allocated to other virtual machines on that node. A memory ballooning driver installed on a virtual machine facilitates the borrowing of the unused memory from other virtual machines. For example, if a virtual machine that is allocated 3 GB needs 5 GB for a particular workload, the memory ballooning driver of that virtual machine may borrow unused 2 GB memory from another virtual machine on that node. Similar to page faults, memory ballooning degrades the performance of the workload and the virtual machine.

Yet other memory compensating techniques include in guest memory swap and host level memory swap. With these techniques, the hypervisor creates a swap space or swap disk, which emulates the physical RAM memory of a virtual machine. When the virtual machine needs more memory than is allocated to that virtual machine, the virtual machine uses a portion of the swap disk to make up for the deficiency. Again, using the swap disk means that the workload takes longer to complete, may possibly be terminated, and ultimately adversely impacts the performance of the virtual machine.

Other memory compensating techniques may be employed as well to make up for memory shortage. Using one or more memory compensating techniques is indicative of inadequate memory on a particular virtual machine. Specifically, since the memory compensating techniques are employed when the virtual machine needs more memory than allocated, if the virtual machine is allocated adequate amount of memory, the memory compensating techniques described above are not needed.

In some cases, the physical RAM memory that is allocated to a particular virtual machine may be adjusted periodically. However, the amount of additional memory to allocate to the virtual machine is generally selected randomly. By randomly selecting the amount of additional memory to allocate, such conventional mechanisms do not accurately reflect the actual memory needs of that virtual machine. The virtual machine may still not have enough memory or may have an excess amount of memory. Additionally, since the amount of host memory is fixed, such random allocation of additional memory may take memory away from other virtual machines needing that memory. Further, the memory demands of a virtual machine may change over time depending upon the workload(s) being run on that virtual machine. The random allocation is not reflective of the changing workload(s).

Thus, the conventional mechanisms of allocating and adjusting the allocation of memory do not make optimal use of the fixed amount of memory resources that are available, prevents the virtual machine from operating at optimum capacity, prevents the optimal use of memory, and is inefficient and unreliable. The present disclosure provides technical solutions. Specifically, the present disclosure provides great improvements in computer related technology.

For example, the present disclosure provides a mechanism by which the memory needs of a particular virtual machine are assessed, and the amount of memory allocated to that virtual machine is adjusted based on that assessment. For example, in some embodiments, memory usage information is collected from virtual machines and analyzed. Past memory consumption patterns are identified from the memory usage information and future memory consumption is predicted based on the past memory consumption patterns. Memory allocation is dynamically adjusted based on that prediction. By virtue of identifying patterns of memory consumption and adjusting memory allocation based on those patterns, the fixed amount of available memory resource is optimally used and shared between the virtual machines. Each virtual machine is allocated the right amount of memory that it needs, without impacting the memory allocated to other virtual machines. By having the appropriate amount of memory needed, reliance on memory compensating techniques is reduced, which in turns improves the performance of workloads on a virtual machine. By having the optimal amount of memory needed, instead of waiting for more memory to be supplied via the memory compensating techniques, that time may be used for running additional workloads. Thus, memory is optimally used, workloads are run faster and with less disruption, and ultimately operation and performance of the virtual machines is improved. Thus, the present disclosure greatly improves computer related technology.

As used herein, "memory usage information" includes data pertaining to active memory consumption, swap memory consumption, memory ballooning, memory page faults per seconds, mapped memory, cache memory usage, and any other memory related parameter that may be indicative of memory usage patterns of the underlying virtual machine. Active memory means the amount of memory that is currently being consumed by a particular virtual machine. The amount of active memory may be less than or more than the physical RAM memory allocated to that virtual machine. The present disclosure analyzes the active memory, and the other memory compensating techniques, to determine the memory consumption patterns and adjusts the memory allocation based on those patterns, as described in greater detail below.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc.

Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
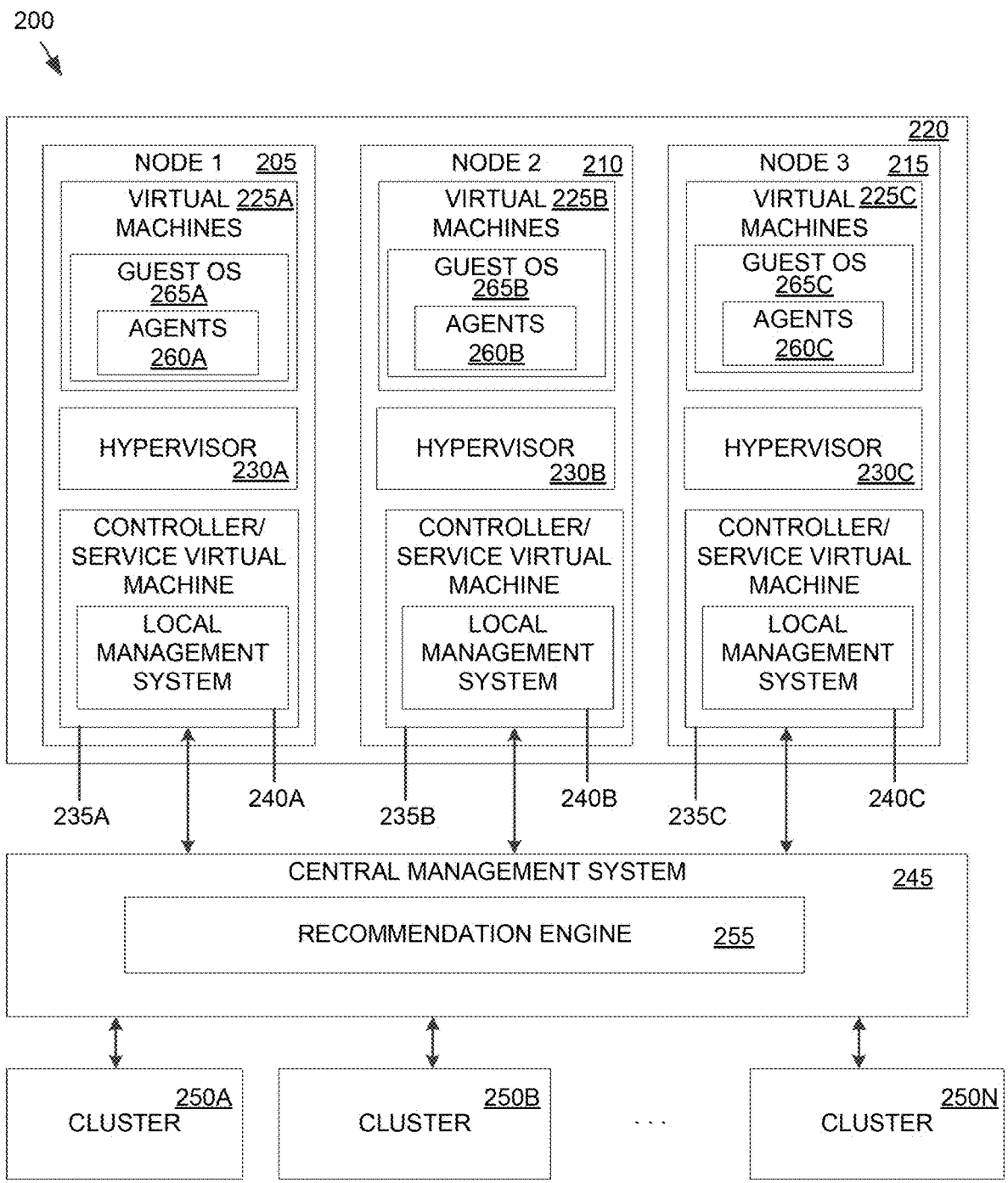
FIG. 2 is another example block diagram of the virtual computing system of FIG. 1, in accordance with some embodiments of the present disclosure.

Turning to FIG. 2, another block diagram of a virtual computing system 200 is shown, in accordance with some embodiments of the present disclosure. The virtual computing system 200 is a simplified version of the virtual computing system 100, but shows additional details not specifically shown in FIG. 1. Although only some of the components have been shown in the virtual computing system 200, the virtual computing system 200 is intended to include other components and features, as discussed above with respect to the virtual computing system 100. As shown, the virtual computing system 200 includes a first node 205, a second node 210, and a third node 215, all of which form part of a cluster 220. Similar to the virtual computing system 100, although only three nodes (e.g., the first node 205, the second node 210, and the third node 215) have been shown in the cluster 220, the number of nodes may vary to be greater than or fewer than three.

The first node 205 includes virtual machines 225A, the second node 210 includes virtual machines 225B, and the third node 215 includes virtual machines 225C. The virtual machines 225A, 225B, and 225C are collectively referred to herein as "virtual machines 225." Additionally, the first node 205 includes a hypervisor 230A and a controller/service virtual machine 235A. Similarly, the second node 210 includes a hypervisor 230B, and a controller/service virtual machine 235B, while the third node 215 includes a hypervisor 230C, and a controller/service virtual machine 235C. The hypervisor 230A, 230B, and 230C are collectively referred to herein as "hypervisor 230." Similarly, the controller/service virtual machine 235A, 235B, and 235C are collectively referred to herein as "controller/service virtual machine 235."

Further, each of the controller/service virtual machine 235A, controller/service virtual machine 235B, and controller/service virtual machine 235C respectively include a local management system 240A, a local management system 240B, and a local management system 240C. The local management system 240A, the local management system 240B, and the local management system 240C (collectively referred to herein as "local management system 240"), in some embodiments, is the Prism Element component from Nutanix, Inc., and may be configured to perform a variety of management tasks on the underlying node (e.g., the first node 205, the second node 210, and the third node 215, respectively).

The virtual computing system 200 also includes a central management system (also referred to herein as "overall management system") 245. The central management system 245, in some embodiments, is the Prism Central component from Nutanix, Inc. that is configured to manage all of the clusters (e.g., including the cluster 220 and clusters 250A-250N) within the virtual computing system 200. In some embodiments, to manage a particular cluster (e.g., the cluster 220), the central management system 245 may communicate with one or more of the local management system 240 of that cluster. In other embodiments, the central management system 245 may communicate with the local management system 240 on the leader node or a local management system designated to communicate with the central management system, which in turn may then communicate with other components within the cluster (e.g., the cluster 220) to perform operations requested by the central management system. Similarly, the central management system 245 may communicate with the local management systems of the nodes of the clusters 250A-250N in the virtual computing system 200 for managing those clusters. The central management system 245 may also receive information from the various components of each cluster through the local management system 240. For example, the virtual machines 225 may transmit information to their underlying instance of the local management system 240, which may then transmit that information either directly to the central management system 245 or to the leader local management system, which may then transmit all of the collected information to the central management system.

The central management system 245 also includes a recommendation engine 255. The recommendation engine 255 receives memory usage information from the virtual machines 225, and analyzes the memory usage information to determine whether the amount (also referred to herein as size or capacity) of memory allocated to each of those virtual machines is appropriate. If the recommendation engine 255 determines that any of the virtual machines 225 needs more memory or has a surplus of memory, the recommendation engine adjusts the amount of memory allocated to that particular virtual machine. Thus, each of the virtual machines 225 has an optimal amount of memory to perform their designated work load(s).

The memory usage information from the virtual machines 225 used by the recommendation engine 255 is collected by agents 260A, 260B, and 260C (collectively referred to herein as "agents 260"). In some embodiments, the agents 260 may be located on a guest operating system ("guest OS") of the underlying virtual machines 225. For example, the agents 260A may be located on a guest OS 265A of the virtual machines 225A, the agents 260B may be located on a guest OS 265B of the virtual machines 225B, and the agents 260C may be located on a guest OS 265C of the virtual machines 225C. The guest OS 265A, 265B, and 265C are collectively referred to herein as the "guest OS 265." In other embodiments, the agents 260 may be located on another component of the underlying virtual machines 225, or possibly on another component of the first node 205, the second node 210, and the third node 215, and be communicably connected to the respective guest OS 265 for collecting memory usage information. The recommendation engine 255 and the agents 260 are part of a memory resizing system, which is described in greater detail in FIG. 3.

Although the recommendation engine 255 has been shown as being part of the central management system 245, in some embodiments, the recommendation engine may be part of one or more of the local management system 240. In yet other embodiments, an instance of the recommendation engine 255 may be on the central management system 245 and another instance of the recommendation engine may be on one or more of the local management system 240. In some embodiments, certain features of the recommendation engine 255 may be made available on the central management system 245 and other features may be made available on one or more of the local management system 240. Thus, the recommendation engine may be configured in a variety of ways.

Figure 3:
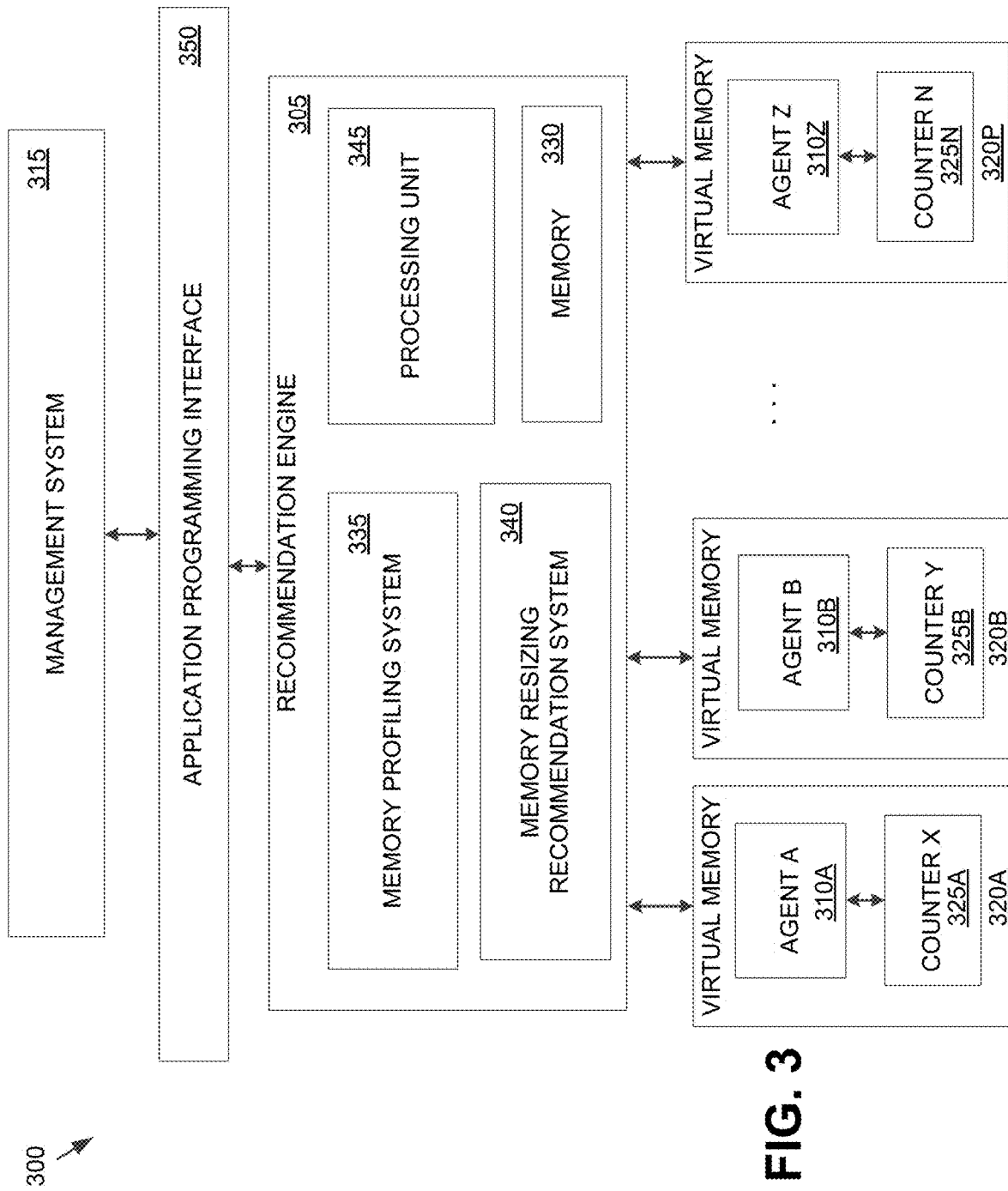
FIG. 3 is an example block diagram of a memory resizing system of the virtual computing system of FIGS. 1 and 2, in accordance with some embodiments of the present disclosure.

Referring now to FIG. 3, an example block diagram of a memory resizing system 300 is shown, in accordance with some embodiments of the present disclosure. The memory resizing system 300 is configured to facilitate collection of memory usage information from one or more virtual machines (e.g., the virtual machines 225 of FIG. 2), analyze the collected memory usage information to determine an optimal amount of memory needed by each of the one or more virtual machines, and dynamically resize the amount of memory allocated to each of the one or more virtual machines based upon the analysis. The memory resizing system 300, thus, includes a recommendation engine 305 that is configured to receive memory usage information, analyze the memory usage information, and make memory resizing recommendations based on the analysis. The recommendation engine 305 is communicably connected to agents 310A-310Z for receiving the memory usage information. The agents 310A-310Z are collectively referred to herein as "agents 310." The recommendation engine 305 may in turn be managed/controlled by a management system 315.

The agents 310 collect memory usage information from one or more virtual machines with which the agents are associated. In some embodiments, the agents 310 may be configured to collect memory usage information from the virtual machine on which a particular agent is located (e.g., installed). For example, as shown in FIG. 3, the agent 310A may be located on and collect memory usage information from virtual machine 320A. Similarly, the agent 310B may be located on and collect memory usage information from virtual machine 320B and the agent 310Z may be located on and collect memory usage information from virtual machine 320P. The virtual machines 320A-320P are collectively referred to herein as "virtual machines 320." Thus, each of the agents 310 may be configured to collect memory usage information from at least one virtual machine (e.g., the virtual machine on which the agent is located).

In other embodiments, one or more of the agents 310 may be configured to collect memory usage information from multiple virtual machines. For example, in some embodiments, one or more of the agents 310 may be configured to collect memory usage information from the underlying virtual machine, as well as other virtual machines that are communicably associated with the one or more agents.

Although the agents 310 have been shown and described as being located on a virtual machine, in some embodiments, the agents 310 may be located on other components (e.g., the hypervisor, the controller/service virtual machine, etc.) of the virtual computing system of which the memory resizing system 300 is a part of, and may be configured to collect memory usage information from the virtual machines 320 remotely.

Additionally, in some embodiments, the agents 310 may be configured to collect all types of memory usage information, while in other embodiments, the agents may be configured to collect one or more particular types of memory usage information. Specifically, memory usage information may be of various types. For example, memory usage information may include active memory usage information, memory page fault information, memory ballooning information, in guest and host level swap disk information, and other types of data indicative of the amount of memory consumption by a particular virtual machine.

When the agents 310 are configured to collect all types of memory usage information, a single instance of an agent may be sufficient to collect all types of memory usage information from a particular virtual machine. When the agents 310 are configured to collect one or more particular types of memory usage information only, depending upon the types of memory usage information being collected from a particular virtual machine, multiple instances of the agents may be needed for that particular virtual machine. Thus, each of the agents 310 may collect all types of memory usage information or specific types of memory usage information from a single virtual machine or from multiple virtual machines.

As used herein, each of the agents 310 is a software program that is configured to operate autonomously (e.g., without specific user input or interaction) to achieve a specific goal. The goal, in the context of the present disclosure, is to gather a specific type of information (e.g., memory usage information) from the virtual machines 320. Each of the agents 310 may be configured to activate itself to achieve the goal of gathering memory usage information based on constraints programmed therein. A configuration file within each of the agents 310 may outline the various constraints and other operating parameters within which the agents operate. For example, the configuration file of each of the agents 310 may identify the identity of the virtual machines 320 from which a particular agent is to collect memory usage information from, the types of memory usage information to collect, the frequency with which to collect the memory usage information, how to handle the collected memory usage information (e.g., whether to save the collected memory usage information before transmission, any data modification techniques to apply, etc.), and so on.

The agents 310 may work independently and/or together to collect memory usage information and transmit the collected memory usage information to the recommendation engine 305. Although described herein as software agents, in some embodiments, one or more of the agents 310 may be configured in hardware or a combination of hardware and software. Also, although not shown, each of the agents 310 may have a memory to at least temporarily store the collected memory usage information, a processing unit to facilitate the collection of the memory usage information, a networking interface to transmit the collected memory usage information to the recommendation engine 305, and any other software and/or hardware element that may be needed to perform the functions described herein.

Further, as mentioned above, in some embodiments, the agents 310 may be located on or at least communicably associated with the guest OS of the virtual machines 320 from which the agents are designated to collect the memory usage information. In some embodiments, the agents 310 collect the memory usage information from memory-related counters on the guest OS of the virtual machines 320. For example, in some embodiments, the agent 310A may be configured to collect memory usage information of the virtual machine 320A from counters 325A, the agent 310B may be configured to collect memory usage information of the virtual machine 320B from counters 325B, and the agent 310Z may be configured to collect memory usage information of the virtual machine 320P from counters 325N. The counters 325A, 325B, and 325N are collectively referred to herein as the "counters 325."

Each of the counters 325 is configured to record memory usage metrics from the underlying virtual machines 320. Each of the counters 325 may be configured in software, hardware, or a combination of hardware and software. In some embodiments, the counters 325 may be configured to collect a specific type of memory usage information. In other embodiments, the counters 325 may collect multiple types of memory usage information. Thus, depending upon the configuration of the counters 325, a single or multiple counters may be provided within each of the virtual machines 320. Additionally, each instance of the agents 310 is connected to all of those counters 325 that are configured to collect the type of memory usage information that the agent is configured to collect from the associated one or more of the virtual machines 320. For example, if the agent 310A is configured to collect active memory usage information and memory ballooning information from the virtual machine 320A, then that agent is communicably connected to those instances of the counters 325A that collect active memory usage information and memory ballooning information.

Additionally, the agents 310 may be configured to collect memory usage information from the counters 325 periodically or continuously. For example, in some embodiments, the agents 310 may be configured to collect memory usage information every second, every pre-determined number of seconds or fractions of seconds, or in any other units of time programmed within the configuration file of those agents. Thus, the agents 310 may automatically collect memory usage information from the counters 325 based upon the collection frequency programmed therein. Each of the agents 310 may be programmed with a different collection frequency. In some embodiments, the agents 310 may, additionally or alternatively, receive instructions from the recommendation engine 305 to collect memory usage information, and upon receiving those instructions, the agents may collect the memory usage information from the counters 325. In those embodiments in which the agents 310 continuously collect memory usage information, the agents may continuously monitor the appropriate ones of the counters 325, and collect memory usage information as soon as that information becomes available. Thus, the collection frequency in which the agents 310 collect memory usage information may vary from one embodiment to another.

In some embodiments, the agents 310 may collect memory usage information from the counters 325 via an Application Programming Interface ("API"). The API may provide an interface with a set of routines, protocols, and tools to allow the agents 310 to access the appropriate ones of the counters 325 and collect the appropriate types of memory usage information therefrom. For example, in some embodiments, to collect memory usage information, an agent (e.g., the agents 310) may establish communication with the API, which in turn may access the appropriate one or more of the counters 325. In particular, the API may extract the memory usage information from the counters 325 and return the collected memory usage information to the agent. Thus, the API may facilitate collection of memory usage information. In some embodiments, the agents 310 may use mechanisms other than an API to collect memory usage information from the counters 325.

Upon receiving the memory usage information from the counters 325 via the API, in some embodiments, the agents 310 may instantaneously transmit the memory usage information to the recommendation engine 305 without first storing the memory usage information therein. This configuration may be desirable in applications with memory constraints. In other embodiments, the agents 310 may temporarily store the memory usage information in an associated buffer (e.g., a memory associated with the agents), in addition to transmitting the memory usage information to the recommendation engine 305. In some embodiments, the agents 310 may simply store the memory usage information received from the counters 325 within the buffer, and transmit the collected memory usage information from the buffer when the buffer is full and/or when a pre-determined period of time has passed, again depending upon the constraints programmed within the agents.

Furthermore, in some embodiments, the agents 310 may append additional information to the memory usage information that is sent to the recommendation engine 305. For example, in some embodiments, the agents 310 may include details of the underlying workloads that generated the memory usage information. The agents 310 may also include time stamp information (e.g., when the memory usage information was collected, when the memory usage information was generated by the virtual machine, etc.), and any other information that is considered desirable or necessary for the recommendation engine 305 to have in analyzing the memory usage information and computing memory resizing recommendations. In some embodiments, the agents 310 may combine (e.g., aggregate) or modify the memory usage information in some way before sending. For example, in some embodiments, the agents 310 may encrypt the memory usage information, apply an average, median, or other mathematical function on the memory usage information before sending to the recommendation engine 305. In some embodiments, the agents 310 may compress the memory usage information before transmission. In some embodiments, the agents 310 may compile the different types of memory usage information associated with a particular workload into one bundle, and transmit the bundle together to the recommendation engine 305. In other embodiments, the recommendation engine 305 may perform one or more of the data combination, modification, compression, etc. tasks indicated above.

As indicated above, in some embodiments, the recommendation engine 305 may be within the central management system 245. To send the memory usage information to the recommendation engine 305, the agents 310 may transmit the collected memory usage information to the underlying local management system 240. For example, the agent 310A may send the collected memory usage information to the local management system (e.g., the local management system 240) of the virtual machine 320A on which that agent is located. The local management system may then transmit the memory usage information received from the agent 310A to the central management system (e.g., the central management system 245) on which the recommendation engine 305 is located.

The recommendation engine 305, thus, collects memory usage information from multiple virtual machines from multiple host machines, and stores all of the memory usage information within a memory 330. When new memory usage information is received from the agents 310, the recommendation engine 305 appends the new memory usage information to the old memory usage information already within the memory 330. By looking at memory usage information of a particular virtual machine from the past, the recommendation engine 305 predicts future memory usage information of that particular virtual machine, as discussed further below.

Referring still to FIG. 3, the recommendation engine 305 also includes a memory profiling system 335 and a memory resizing recommendation system 340. The memory profiling system 335 is configured to analyze memory usage information stored in the memory 330 to determine one or more memory profiles, and the memory resizing recommendation system 340 is configured to use the one or more memory profiles from the memory profiling system to make memory resizing predictions. Although the memory profiling system 335 and the memory resizing recommendation system 340 are shown as separate components, in some embodiments, those components may be integrated together, and the integrated component may perform the functions of the separate components, as disclosed herein.

The memory profiling system 335 analyzes memory usage information to determine historical memory usage profiles and/or current memory usage profiles. Historical memory usage profiles includes compilation of memory usage information from a first past pre-determined time period from which historical or long-term memory consumption trends of a particular virtual machine may be identified. Similarly, current memory usage profiles includes compilation of memory usage information from a second past pre-determined time period from which current or short-term memory consumptions trends of a particular virtual machine may be identified. The first past pre-determined time period is longer than the second past pre-determined time period. Simply as an example and without intending to be limiting in any way, the first past pre-determined time period may include memory usage information from the past one year and the second past pre-determined time period may include memory usage information from the past twenty four hours.

To determine historical memory usage profiles and/or current memory usage profiles, in some embodiments, the memory profiling system 335 may implement time series modeling. The memory profiling system 335 may use any of a variety of time series modeling techniques for analyzing the memory usage information. With time-series modeling, each piece of memory usage information of a particular virtual machine may be considered a data point, and the memory profiling system 335 may map (e.g., plot on graph, list in a chart or table, etc.) the data points at equally spaced points in time to identify and extract meaningful statistics of historical memory consumption. For example, to determine a historical memory usage profile of a particular virtual machine, the memory profiling system 335 may receive memory usage information of that virtual machine from the memory 330 from the first past pre-determined time period. The memory profiling system 335 may then map each piece of the memory usage information using a time series modeling technique to obtain the historical memory usage profile of that particular virtual machine. Similarly, to determine current memory usage profile of a particular virtual machine, the memory profiling system 335 may receive memory usage information for that virtual machine from the memory 330 for the second past pre-determined time period and map that memory usage information using time series modeling.

Further, in some embodiments, the memory profiling system 335 may determine separate historical and current memory usage profiles for the different types of memory usage information. For example, for a particular virtual machine, the memory profiling system 335 may determine historical and current memory usage profiles for each of active memory usage, memory ballooning information, and so on. By analyzing each type of memory usage information separately, the memory profiling system 335 may provide insights into whether active memory consumption varies from initial memory allocation, and the types of memory compensating techniques that a particular virtual machine uses to compensate for inadequate initial memory allocation.

In other embodiments, the memory profiling system 335 may analyze some or all types of memory usage information associated with a particular workload on a particular virtual machine. By creating workload specific historical and current memory usage profiles, the overall memory consumption of a specific workload may be determined. Workload specific profiles may be particularly helpful when certain workloads consume significantly more (or less) memory than other workloads.

Separate analyses provide a more detailed and thorough understanding of the memory usage patterns of a particular virtual machine. For example, by separately analyzing the active memory of each process running on a particular virtual machine, the memory resizing recommendation system 340 may determine that one workload consumes more memory than any other workloads running on that virtual machine. Thus, the memory resizing recommendation system 340 may determine that the initial memory allocation for that virtual machine is generally okay except for when that one particular workload is run on the virtual machine. In such cases, instead of increasing the initial memory allocation of that particular virtual machine for one workload, the memory resizing recommendation system 340 may either designate that workload to be run on another virtual machine that already has the initial memory allocation needed by that workload, temporarily increase the initial memory allocation only for periods of time when that workload is being run, or take other calculated action.

Thus, depending upon the insights desired from the memory usage information, the memory usage information that is used for creating the historical and current memory usage profiles may vary. By modeling memory usage information, various long-term and short-term trends in memory consumption may be easily identified. For example, by analyzing the modeled memory usage information, it may be determined whether the memory usage increases or decreases during certain days and/or times of day, certain workloads consume more memory than others, whether a particular virtual machine consistently or intermittently uses more memory than allocated, whether the virtual machine has more memory than consumed, etc. The memory profiling system 335 may store the historical and current memory usage profiles within the memory 330.

The memory profiling system 335 may be configured to determine historical and current memory usage profiles periodically, continuously, or on demand. For example, in some embodiments, the memory profiling system 335 may determine an initial historical and current memory usage profile and then update those profiles every pre-determined time period. In other embodiments, the memory profiling system 335 may continuously update the historical and current memory usage profiles as new memory usage information becomes available. In some embodiments, additionally or alternatively, the memory profiling system 335 may receive a request from the memory resizing recommendation system 340 and/or the management system 315, and the memory profiling system may determine historical and current memory usage profiles based upon that request.

Further, in some embodiments, the memory profiling system 335 may be configured to identify certain trends from the modeled memory usage information and make reports therefrom. For example, for a particular virtual machine, the memory profiling system 335 may determine whether the virtual machine consumed more or less memory than allocated in a given time period, historical and current memory consumption trends, etc. The memory profiling system 335 may also identify the virtual machine for which the report is generated, the amount of memory allocated to that virtual machine, the parameters of the modeling (e.g., the time frame within which the modeling was performed, etc.), identify details of when memory consumption exceeded allocated memory, other memory usage anomalies/behaviors identified (e.g., high/low swap rate, high/low balloon rat, etc.), etc. The memory profiling system 335 may store the report within the memory 330 and/or notify the management system 315 when such reports (or updates to a report) are available.

The memory resizing recommendation system 340 uses the analysis performed by the memory profiling system 335 to predict future memory usage for a particular virtual machine. Specifically, the memory resizing recommendation system 340 determines, from the current memory usage profiles of a particular virtual machine, whether the amount of memory allocated to that particular virtual machine is optimal or more or less than what that virtual machine actually needs. Based upon the needs of the virtual machine as identified from the current memory usage profiles, the memory resizing recommendation system 340 uses the historical memory usage profiles to predict the future memory usage profiles, and then determine a revised memory allocation based on the future memory usage profiles.

The memory resizing recommendation system 340 may, in some embodiments, convey the revised memory allocation determinations to the management system 315, which can then adjust the memory allocated to a particular virtual machine. In other embodiments, the memory resizing recommendation system 340 may be configured to automatically adjust the memory allocation itself. For example, the memory resizing recommendation system 340 may communicate the revised memory allocation to the hypervisor of the underlying virtual machine and the hypervisor may change the memory allocation of that virtual machine. Additionally, the memory resizing recommendation system 340 may store the revised memory allocation within the memory 330 for future reference.

The recommendation engine 305, and particularly the memory profiling system 335 and the memory resizing recommendation system 340 of the recommendation engine may be configured as hardware, software, firmware, or a combination thereof. Specifically, the recommendation engine 305 may include a processing unit 345 configured to execute instructions for implementing the memory profiling system 335 and the memory resizing recommendation system 340, and the other functionalities of the recommendation engine. The processing unit 345 may be implemented in hardware, firmware, software, or any combination thereof. The processing unit 345 executes one or more instructions for implementing the memory profiling system 335, the memory resizing recommendation system 340, and the other functionalities of the recommendation engine 305. "Executing an instruction" means that the processing unit 345 performs the operations called for by that instruction.

The processing unit 345 may retrieve a set of instructions from a memory for execution. For example, in some embodiments, the processing unit 345 may retrieve the instructions from a permanent memory device like a read only memory (ROM) device and copy the instructions in an executable form to a temporary memory device that is generally some form of random access memory (RAM). The ROM and RAM may both be part of the memory 330, which in turn may be provisioned from the storage pool 170 of FIG. 1 in some embodiments. In other embodiments, the memory 330 may be separate from the storage pool 170 or only portions of the memory 330 may be provisioned from the storage pool. In some embodiments, the memory in which the instructions are stored may be separately provisioned from the storage pool 170 and/or the memory 330. The processing unit 345 may be a special purpose computer, as well include logic circuits, hardware circuits, etc. to carry out those instructions. The processing unit 345 may include a single stand-alone processing unit, or a plurality of processing units that use the same or different processing technology. The instructions may be written using one or more programming language, scripting language, assembly language, etc.

Referring still to FIG. 3, as indicated above, the recommendation engine 305 may be managed and operated by the management system 315. Thus, the recommendation engine 305 may form the back-end of the memory resizing system 300, while the management system 315 may form the front-end of the memory resizing system. A user may, via the management system 315, instruct the recommendation engine 305 to perform one or more operations. Example operations may include instructions to deploy new agents, delete existing agents, modify the configuration of an existing agent to collect memory usage information, etc. Upon receiving instructions from the management system 315, the recommendation engine 305 may perform actions consistent with those instructions. Thus, the recommendation engine 305 is not visible to the user, but is rather configured to operate under control of the management system 315, which is visible to and operated by the user.

In some embodiments, the management system 315 may be installed on a device associated with the central management system (e.g., the central management system 245) and/or the local management system (e.g., the local management system 240). In some embodiments, the management system 315 may be accessed physically from the device on which the memory resizing system 300 (and particularly the recommendation engine 305) is installed. In other embodiments, the memory resizing system 300 and the management system 315 may be installed on separate devices. Further, the management system 315 may be configured to access the recommendation engine 305 via an API 350. The API 350 may be separate and different from the API used to facilitate collection of the memory usage information via the agents 310. To access the recommendation engine 305 via the API 350, users may access the management system 315 via designated devices such as laptops, desktops, tablets, mobile devices, other handheld or portable devices, and/or other types of computing devices that are configured to access the API. These devices may be different from the device on which the recommendation engine 305 is installed.

In some embodiments and when the management system 315 is configured for use via the API 350, the users may access the recommendation engine 305 via a web browser and upon entering a uniform resource locator ("URL") for the API. Using the API 350, the users may then send instructions to the recommendation engine 305 and receive information back from the recommendation engine. In some embodiments, the API 350 may be a representational state transfer ("REST") type of API. In other embodiments, the API 350 may be any other type of web or other type of API (e.g., ASP.NET) built using any of a variety of technologies, such as Java, .Net, etc., that is capable of accessing the recommendation engine 305 and facilitating communication between the users and the recommendation engine.

In some embodiments, the API 350 may be configured to facilitate communication between the users via the management system 315 and the recommendation engine 305 via a hypertext transfer protocol ("HTTP") or hypertext transfer protocol secure ("HTTPS") type request. The API 350 may receive an HTTP/HTTPS request and send an HTTP/HTTPS response back. In other embodiments, the API 350 may be configured to facilitate communication between the management system 315 and the recommendation engine 305 using other or additional types of communication protocols.

In other embodiments, instead of or in addition to being installed on a particular device as discussed above, the management system 315 may be hosted on a cloud service and may be accessed via the cloud using the API 350 or other mechanism. In some embodiments, the management system 315 may additionally or alternatively be configured as a mobile application that is suitable for installing on and access from a mobile computing device (e.g., a mobile phone). In other embodiments, the management system 315 may be configured for user access in other ways.

Thus, the management system 315 provides a user interface that facilitates human-computer interaction between the users and the recommendation engine 305. Thus, the management system 315 is configured to receive user inputs from the users via a graphical user interface ("GUI") of the management system and transmit those user inputs to the recommendation engine 305. The management system 315 is also configured to receive outputs from the recommendation engine 305 and present those outputs to the users via the GUI of the management system. The GUI may present a variety of graphical icons, visual indicators, menus, visual widgets, and other indicia to facilitate user interaction. In other embodiments, the management system 315 may be configured as other types of user interfaces, including for example, text-based user interfaces and other man-machine interfaces. Thus, the management system 315 may be configured in a variety of ways.

Further, the management system 315 may be configured to receive user inputs in a variety of ways. For example, the management system 315 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the management system. The management system 315 may also be configured to present outputs to the users in a variety of ways. For example, the management system 315 may be configured to present information to external systems such as users, memory, printers, speakers, etc.

Therefore, although not shown, the management system 315 may be associated with a variety of hardware, software, firmware components, or combinations thereof. Generally speaking, the management system 315 may be associated with any type of hardware, software, and/or firmware component that enables the recommendation engine 305 to perform the functions described herein and further enables a user to manage and operate the recommendation engine.

Figure 4:
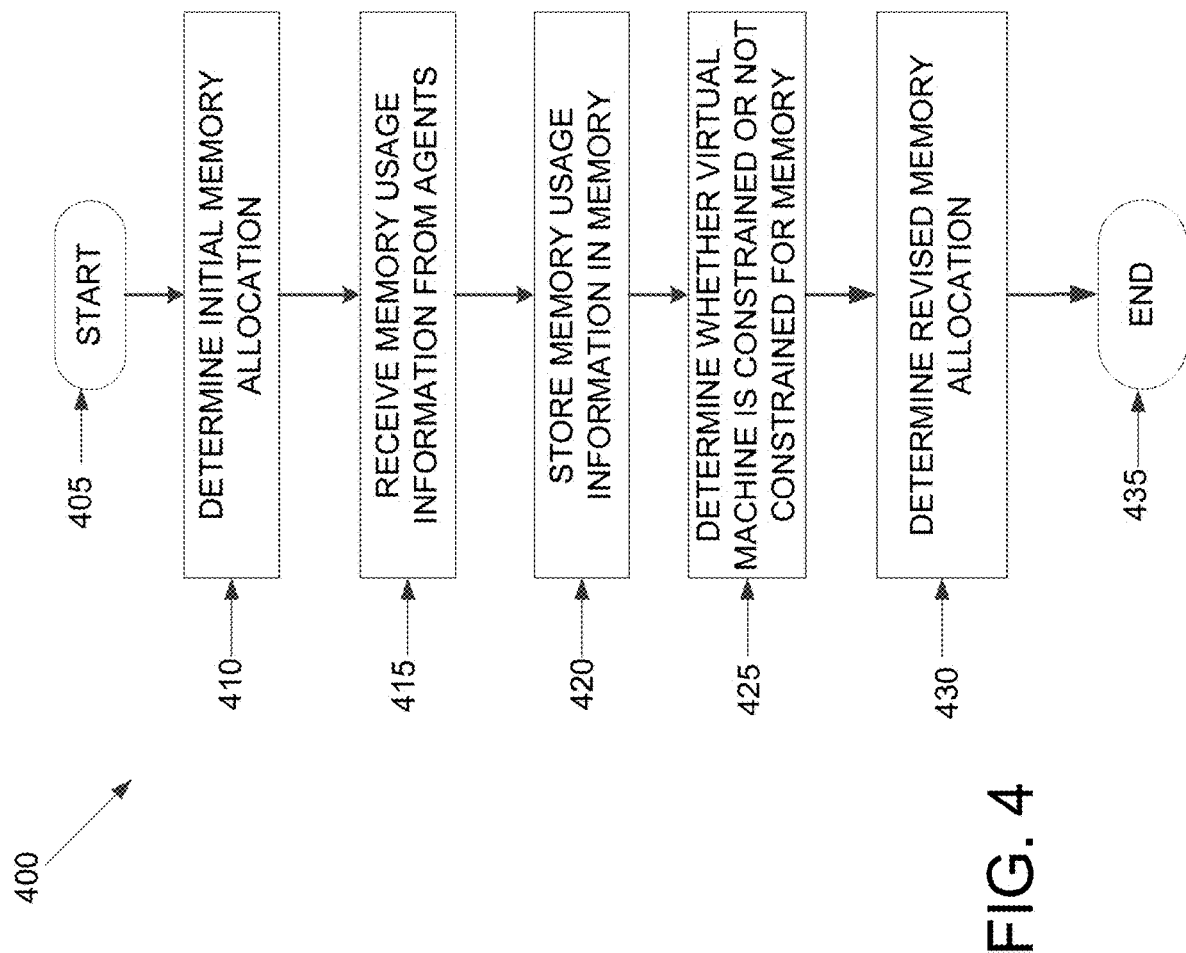
FIG. 4 is an example flowchart outlining operations performed by the memory resizing system of FIG. 3 for adjusting memory sizes within the virtual computing systems of FIGS. 1 and 2, in accordance with some embodiments of the present disclosure.

Turning now to FIG. 4, an example flow chart outlining operations of a process 400 are shown, in accordance with some embodiments of the present disclosure. The process 400 may include additional, fewer, or different operations, depending on the particular embodiment. The process 400 is discussed in conjunction with FIG. 3 and is implemented by the recommendation engine 305. The process 400 starts at operation 405 with the deployment of the agents 310 to collect memory usage information related to the virtual machines 320 from the counters 325. The agents 310 may be deployed by the management system 315 and/or by the recommendation engine 305 upon request from the management system.

At operation 410, the recommendation engine 305 receives the "initial memory allocation" or the actual amount of memory currently allocated to each of the virtual machines 320 at operation 420. The recommendation engine 305 may receive the initial memory allocation from the virtual machines 320 directly, from the management system 315, from the agents 310, or from any other source. The recommendation engine 305 receives the memory usage information pertaining to the virtual machines 320 from the agents 310 at operation 415.

At operation 420, the recommendation engine 305 stores the received memory usage information within the memory 330. The recommendation engine 305 may also keep track of additional information associated with that received memory usage information. For example, the recommendation engine 305 may keep track of the identities of the virtual machines 320 from which the memory usage information is collected, the specific processes (e.g., workloads) which generated the memory usage information, and any other data that the recommendation engine is configured to keep track of. As indicated above, in some embodiments, the agents 310 may append additional information to the memory usage information before transmission to the recommendation engine 305. In other embodiments, the recommendation engine 305 may receive the additional directly from the virtual machines 320 or from any other source. The recommendation engine 305 may store such additional information in the memory 330 as well.

The recommendation engine 305, and particularly, the memory resizing recommendation system 340 of the recommendation engine determines, at operation 425, whether a particular virtual machine is "constrained" for memory or not. A virtual machine (e.g., the virtual machines 320) is "constrained" for memory or "under-provisioned" when the amount of memory allocated to that virtual machine is less than what the virtual machine generally needs or consumes for performing a process or workload. Similarly, a virtual machine is "not constrained" for memory when the amount of memory allocated to that virtual machine is appropriate or more than what the virtual machine generally needs or consumes. The recommendation engine 305 determines whether a particular virtual machine is constrained or not constrained based on the current memory usage profiles of that virtual machine.

If the recommendation engine 305 finds a virtual machine (e.g., the virtual machines 320) to be constrained, at operation 430, the recommendation engine determines how much additional memory that particular virtual machine needs to become not constrained. Similarly, if a virtual machine is not constrained (e.g., has additional memory that is not used), the recommendation engine 305 may determine how much extra memory that particular virtual machine has, which may then be moved to constrained virtual machines. Based on the determination of the amount of surplus or deficient memory that each virtual machine has, the recommendation engine 305 then determines the revised memory allocation for each virtual machine at the operation 430.

The recommendation engine 305 may output the revised memory allocation determination to the management system 315, which may then modify the initial memory allocation based upon the revised memory allocation. In some embodiments, the recommendation engine 305 may automatically modify the initial memory allocation based upon the revised memory allocation. The recommendation engine 305 may also store the revised memory allocation within the memory 330. The process 400 ends at operation 435.

Figure 5:
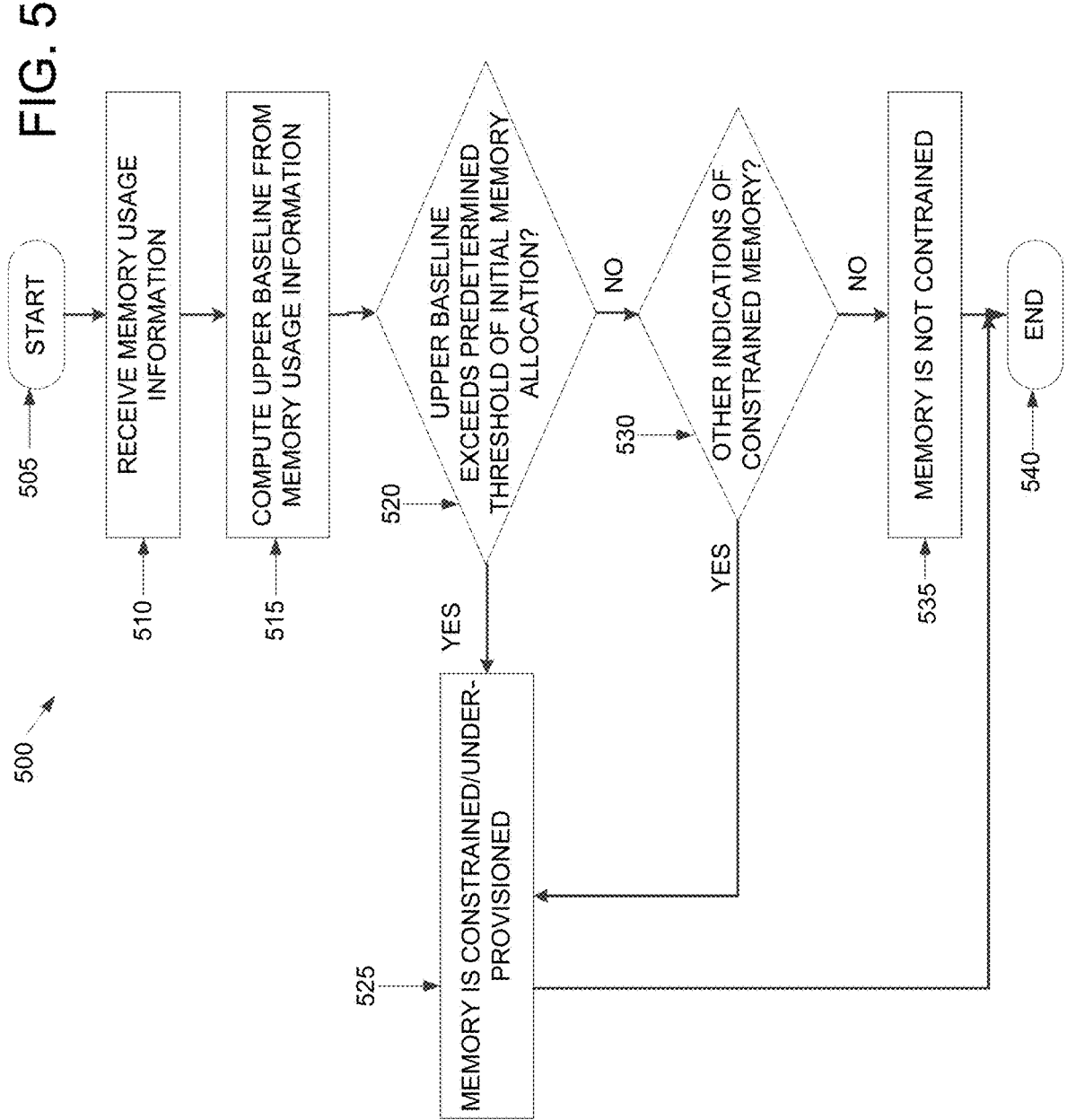
FIG. 5 is an example flowchart outlining certain operations of the flowchart of FIG. 4 in greater detail, in accordance with some embodiments of the present disclosure.

Turning now to FIG. 5, an example flowchart outlining operations of a process 500 is shown, in accordance with some embodiments of the present disclosure. The process 500 may include additional, fewer, or different operations, depending on the particular embodiment. The process 500 is discussed in conjunction with FIGS. 3 and 4 and is implemented by the memory resizing recommendation system 340 of the recommendation engine 305. The process 500 outlines the operation 425 of FIG. 4 in greater detail. Thus, the process 500 starts at operation 505 with the recommendation engine 305 receiving the memory usage information of the virtual machines 320 from the agents 310, storing the memory usage information within the memory 330, and when the memory resizing recommendation system 340 is ready to analyze the memory consumption patterns of a particular virtual machine.

In some embodiments, the memory resizing recommendation system 340 may be configured to analyze the memory consumptions patterns of one or more of the virtual machines 320 at a predetermined frequency. The frequency or how often the memory resizing recommendation system 340 analyzes the memory consumption patterns of each of the virtual machines 320 may be programmed within the memory resizing recommendation system. Each of the virtual machines 320 may have a different frequency with which the memory resizing recommendation system 340 analyzes their memory consumption pattern. For example, in some embodiments, the memory resizing recommendation system 340 may analyze the memory consumption patterns of the virtual machines 320 once a day. In other embodiments, the memory resizing recommendation system 340 may perform the analysis more or less than once a day. In some embodiments, the memory resizing recommendation system 340 may be configured to generally analyze the memory consumption patterns of the virtual machines 320 at a predetermined frequency (e.g., once a day) except in anticipated periods of high/abnormal memory usage when the memory resizing recommendation system may analyze the memory usage patterns more frequently. Thus, the frequency with which the memory resizing recommendation system 340 analyzes the memory consumption pattern of each of the virtual machines 320 may vary from one embodiment to another.

Additionally, in some embodiments, the memory resizing recommendation system 340 may be configured to analyze the memory consumption patterns at an idle time or a time when the virtual machine (e.g., the virtual machines 320) being analyzed is not running a heavy workload. For example, in some embodiments, a virtual machine may be less busy at night or on weekends. In such cases, the memory resizing recommendation system 340 may be configured to perform the process 500 during night time or weekends so as not to disrupt virtual machine operation and take away resources that may otherwise be utilized by the virtual machines 320. The memory resizing recommendation system 340 may identify idle or slower time periods from the historical memory usage profiles. Thus, if the memory resizing recommendation system 340 determines that the memory usage of a particular virtual machine has been generally low or reduced at a particular time period or on a particular day in the past, the memory resizing recommendation system may perform the process 500 during those time periods/days.

To analyze the memory consumption patterns of a particular one of the virtual machines 320, at operation 510, the memory resizing recommendation system 340 receives the current memory usage profile of that virtual machine from the memory profiling system 335. In some embodiments, the memory resizing recommendation system 340 may retrieve (or instruct the memory profiling system 335 to retrieve) the memory usage information corresponding to the virtual machine being analyzed from the memory 330, and request the memory profiling system 335 to generate the current memory usage profile for that virtual machine based on the memory usage information. In other embodiments, the memory resizing recommendation system 340 may itself generate the current memory usage profile of that virtual machine.

To retrieve the memory usage information of a particular virtual machine from the memory 330 for generating the current memory usage profile, the memory resizing recommendation system 340 (or the memory profiling system 335 upon receiving indication from the memory resizing recommendation system) may identify the identity of the virtual machine whose memory usage information is to be retrieved. The memory resizing recommendation system 340 may also identify the time period from which the memory usage information is to be retrieved. As indicated above, the current memory usage profile is based upon a second predetermined time period. The second predetermined time period may correspond to the frequency with which the memory resizing recommendation system 340 analyzes the memory consumption patterns of that virtual machine. For example, if the memory resizing recommendation system 340 is configured to analyze the memory consumption pattern every day, the memory resizing recommendation system (and/or the memory profiling system 335) may retrieve the memory usage information collected within the past one day.

Further, in some embodiments, the memory resizing recommendation system 340 may be configured to analyze the memory consumption patterns of a particular virtual machine based upon certain types of memory usage information. For example, in some embodiments, the memory resizing recommendation system 340 may be configured to analyze the memory consumption patterns based only upon active memory usage. In other embodiments, the memory resizing recommendation system 340 may be configured to analyze the memory consumption patterns based upon one or more memory compensating techniques as well. Thus, the memory resizing recommendation system 340 (and/or the memory profiling system 335) retrieves the memory usage information corresponding to the types of memory usage information that the memory resizing recommendation system is configured to analyze.

Thus, the memory resizing recommendation system 340 identifies the memory usage information from which the memory profiling system 335 creates one or more current memory usage profile (e.g., one current memory profile corresponding to each type of memory usage information), as discussed above. The memory resizing recommendation system 340 receives each of the current memory usage profiles from the memory profiling system 335 at the operation 510. From each of the current memory usage profile, the memory resizing recommendation system 340, at operation 515, determines an upper baseline and a lower baseline of memory usage. For example, the memory resizing recommendation system 340 may determine an upper baseline and a lower baseline for active memory usage, another set of upper and lower baseline for page faults, yet another set of upper and lower baselines for memory ballooning, and so on.

The "upper baseline" identifies one or more peak or highest actual memory usage values of a particular virtual machine within the second predetermined time period (e.g., one day). The "lower baseline" identifies one or more lowest actual memory usage values of that virtual machine within the second predetermined time period (e.g., one day). The memory resizing recommendation system 340 may also determine other memory usage values such as average memory usage values, median or mode memory usage values, etc. from the current memory usage profiles.

As indicated above, the current memory usage profiles are generated by time series modeling and provide insights into general trends of memory consumptions within a particular time period. To determine the upper baseline, the memory resizing recommendation system 340 determines one or more highest values of memory usage in each of the current memory usage profiles. In some embodiments, the memory resizing recommendation system 340 may identify the highest values as values that are within a pre-determined percentage (e.g., highest 10% values), an absolute number of highest values (e.g., top five values) of memory usage, etc. In other embodiments, other functions may be applied to determine the highest or peak values from the current memory usage profiles.

Further, in some embodiments, if multiple highest values are identified, the memory resizing recommendation system 340 may aggregate the values using a mathematical function. For example, in some embodiments, the memory resizing recommendation system 340 may compute an average of all identified highest values to obtain the upper baseline. In other embodiments, the memory resizing recommendation system 340 may simply identify the highest value, and use that highest value as the upper baseline.

Similarly, for computing the lower baseline, the memory resizing recommendation system 340 may determine one or more lowest values of memory usage, and possibly combine those values to compute the lower baseline. The memory resizing recommendation system 340 may at least temporarily store the computed upper and lower baselines within the memory 330.

Further, in some embodiments, the memory resizing recommendation system 340 may be configured to identify additional information from the current memory usage profiles. For example, in some embodiments, the memory resizing recommendation system 340 may also identify the processes (e.g., workloads) corresponding to the upper and/or lower baselines, etc. In some embodiments, when the memory resizing recommendation system 340 is configured to analyze the memory usage patterns based upon specific processes, the memory resizing recommendation system 340 may compute the upper and lower baselines for those specific processes. Thus, at the operation 515, the memory resizing recommendation system 340 computes at least one upper baseline and at least one lower baseline. The upper and lower baselines provide a general trend of memory consumption of a particular virtual machine. For example, the upper baseline is indicative of the highest memory consumption of that virtual machine within the second predetermined time period. Likewise, the lower baseline is indicative of the lowest memory consumption of that virtual machine within the second predetermined time period.

At operation 520, the memory resizing recommendation system 340 analyzes at least the computed upper baseline corresponding to active memory usage against the initial memory allocation of the virtual machine being analyzed. For example, if the memory resizing recommendation system 340 determines that the upper baseline of active memory usage exceeds a predetermined threshold for active memory usage, the memory resizing recommendation system concludes that the virtual machine is using more memory than the amount initially allocated thereto. In some embodiments, the predetermined threshold may be based on a specific percentage of the initial memory allocation. If the upper baseline exceeds the specific percentage, the memory resizing recommendation system 340 determines that the virtual machine is generally consuming all or substantially all of its initial memory allocation, and therefore, additional memory may need to be allocated to that virtual machine. As an example, if the upper baseline is greater than 99% of the initial memory allocation, the memory resizing recommendation system 340 may determine that the virtual machine's memory consumption is very close to its initial memory allocation. In such cases, at operation 525, the memory resizing recommendation system 340 classifies that virtual machine as constrained for memory, or in other words, under-provisioned.

In some embodiments, in addition to or instead of, analyzing the active memory usage against the upper baseline, the memory resizing recommendation system 340 also analyzes the memory page faults being generated by the virtual machine. As indicated above, if the virtual machine needs more memory than its initial memory allocation, the virtual machine generates a page fault. A high number of page faults may be indicative of the virtual machine needing more memory than its initial memory allocation. What constitutes a "high" number of page faults may be programmed within the memory resizing recommendation system 340.

On the other hand, if the memory resizing recommendation system 340 determines at the operation 520 that the upper baseline is within the predetermined threshold of the operation 520 (and/or does not have a high number of page faults), it means that the virtual machine is not consuming all or substantially all of its initial memory allocation. However, in some cases, as indicated above, the virtual machine's actual active memory usage may be lower than the initial memory allocation due to other memory compensating techniques that supply additional amounts of memory to the virtual machine. Such compensation techniques may include one or more of memory ballooning, host level swap rate, in guest memory swap, etc. Thus, at operation 530, the memory resizing recommendation system 340 determines if the virtual machine is using one or more of such memory compensating techniques, which may explain the low (or lower) active memory usage of that virtual machine.

Therefore, at the operation 530, the memory resizing recommendation system 340 analyzes the upper baselines of one or more of the various memory compensating techniques. For example, the memory resizing recommendation system 340 may determine whether the memory ballooning upper baseline exceeds a predetermined threshold (which may be different from the predetermined threshold of the operation 520). If the memory resizing recommendation system 340 determines that the virtual machine is using at least one of the memory compensating techniques at a level that is abnormal (e.g., higher than expected), the memory resizing recommendation system may designate that virtual machine as constrained at the operation 525. On the other hand, if the memory resizing recommendation system 340 finds no indication of using one or more such compensating memory techniques, the memory resizing recommendation system determines, at operation 535, that the virtual machine is not constrained for memory. In other words, the initial memory allocation of that virtual machine may be sufficient for that virtual machine's purposes, and possibly, the virtual machine has more memory than it can use.

Thus, by using the process 500, the memory resizing recommendation system 340 determines, based on actual memory usage of a particular virtual machine, whether that virtual machine needs more memory or possibly has extra memory. The process 500 ends at operation 540.

Figure 6:
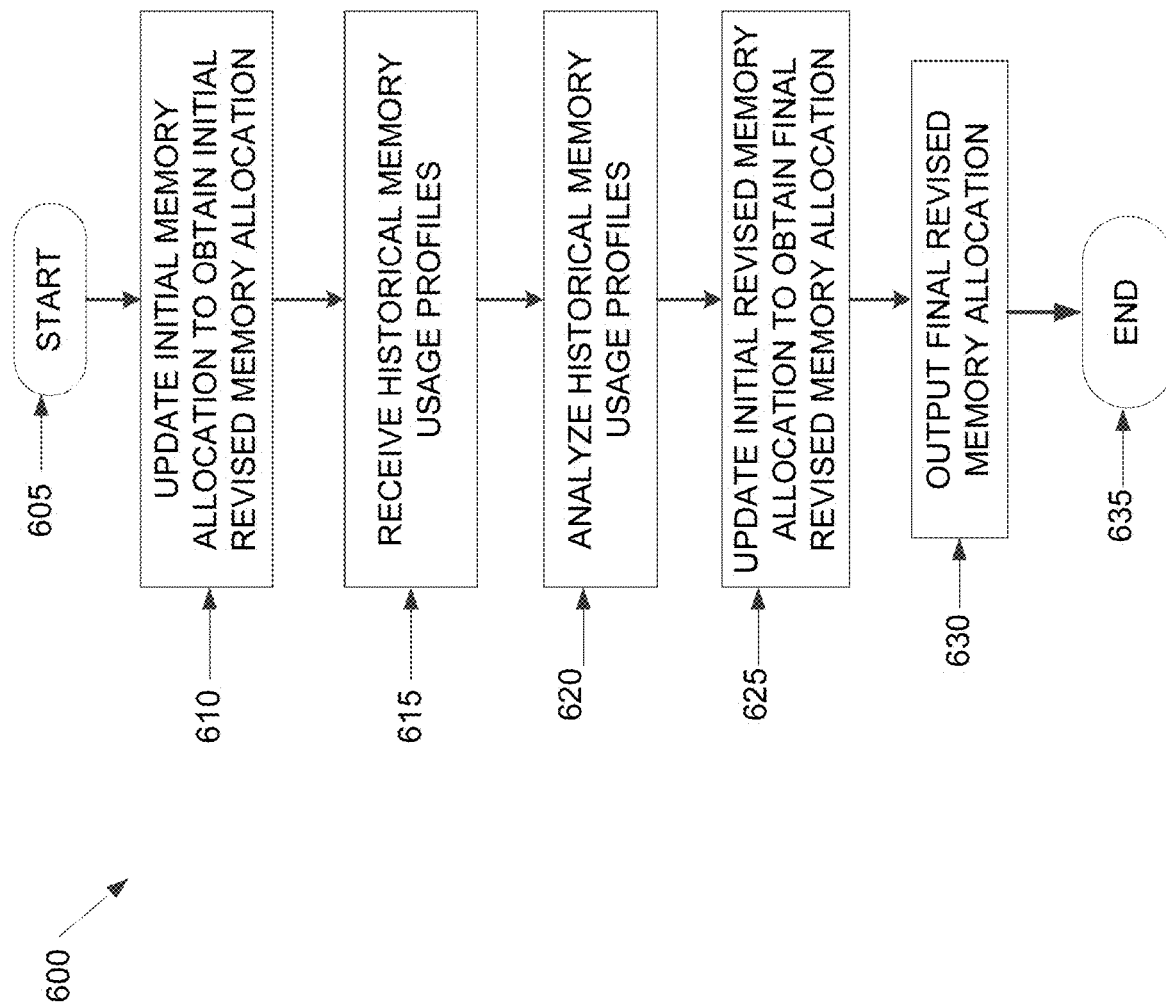
FIG. 6 is an example flowchart outlining certain operations of the flowchart of FIG. 5 in greater detail, in accordance with some embodiments of the present disclosure.

Upon designating a virtual machine (e.g., one of the virtual machines 320) as constrained for memory, the memory resizing recommendation system 340 determines a revised or optimal memory allocation for that particular virtual machine via process 600 of FIG. 6. Thus, the process 600 may be reached from the operation 525 of FIG. 5. The process 600 may include additional, fewer, or different operations, depending on the particular embodiment. The process 600 is discussed in conjunction with FIGS. 3-5 and is implemented by the memory resizing recommendation system 340. The process 600 starts at operation 605 with determining that a particular virtual machine is constrained for memory and that additional memory needs to be allocated to that virtual machine. To determine how much additional memory needs to be allocated to that particular virtual machine, the memory resizing recommendation system 340 analyzes the historical memory usage profiles of that virtual machine to predict future memory usage.

At operation 610, the memory resizing recommendation system 340 adds a predetermined percentage of memory to the upper baseline computed at the operation 515 of FIG. 5 to obtain an initial revised memory allocation. Specifically, if the reason for constrained memory is active memory usage exceeding the initial memory allocation, the memory resizing recommendation system 340 may add a predetermined fraction to the upper baseline computed for active memory usage from the current memory usage profile. For example, if the predetermined fraction is 20% and the upper baseline is 100% of initial memory allocation, the the memory resizing recommendation system 340 may compute the initial revised memory allocation as the sum of 100% upper baseline plus 20% such that the initial revised memory allocation is 120% of the initial memory allocation. Thus, the initial revised memory allocation is a factor of the upper baseline.

Similarly, if the reason for constrained memory is one or more memory compensating techniques, the memory resizing recommendation system 340 may determine the initial revised memory allocation as a factor of the initial memory allocation and a predetermined fraction of the upper baseline. As an example, if the memory compensating technique used is memory swap disk, the upper baseline is indicative of the highest amount of memory swap disk being used, and if the predetermined fraction is 20% of the upper baseline, the memory resizing recommendation system 340 may determine the initial revised memory allocation is equal to the initial memory allocation plus 20% or 120% of the initial memory allocation.

Upon determining the initial revised memory allocation, the memory resizing recommendation system 340 also determines whether the initial revised memory allocation needs to be adjusted in any way to account for certain trends or seasonal impacts that may be coming up in the future. To determine what, if any, adjustments to the initial revised memory allocation are needed, the memory resizing recommendation system 340 analyzes the historical memory usage profiles of that virtual machine. By analyzing the historical memory usage profiles, the memory resizing recommendation system 340 may identify certain past trends (e.g., moving average) of memory consumption. The memory resizing recommendation system 340 may also identify "seasonal impacts" where the memory consumption is abnormally higher or lower than the moving average. The combination of past trends and seasonal impacts from the historical memory usage profiles and the upper and lower baselines from the current memory usage profiles may provide a glimpse of memory consumption for that virtual machine in the future.

Thus, at operation 615, the memory resizing recommendation system 340 receives the historical memory usage profiles of the virtual machine being analyzed from the memory profiling system 335. Similar to receiving the current memory usage profiles, the memory resizing recommendation system 340 may identify the identity of the virtual machine and the type of memory usage information whose historical memory usage profile is desired.

At operation 620, the memory resizing recommendation system 340 analyzes the historical memory usage profiles by identifying general trends and seasonal impacts. For example, the memory resizing recommendation system 340 may determine a moving average value of active memory consumption from the historical memory usage profiles to identify general trends of memory usage. The memory resizing recommendation system 340 may compare the moving average value with the initial revised memory allocation to determine if the initial revised memory allocation value is likely to be sufficient for future usage. If the memory resizing recommendation system 340 determines that the initial revised memory allocation is unlikely to be sufficient for the future based upon the past memory usage trends, the memory resizing recommendation system may adjust the initial revised memory allocation at operation 625.

Specifically, the memory resizing recommendation system 340 may determine a difference between the values of the initial revised memory allocation and the moving average of the historical memory usage profile and add the difference (plus an additional amount if desired) to the initial revised memory allocation. The memory resizing recommendation system 340 may also account for any seasonal impacts where the memory usage is expected to be abnormally higher or lower. For expected periods with abnormally high memory usage, the memory resizing recommendation system 340 may add at least a portion of the amount of the abnormally high memory usage to the initial revise memory allocation as well.

In some embodiments, the memory resizing recommendation system 340 may determine one or more upper baselines from the historical memory usage profiles in a similar fashion as discussed above and compare these upper baselines with the initial revised memory allocation value. These upper baselines may account for both general trends and seasonal impacts. The memory resizing recommendation system 340 may add at least a fraction of the upper baseline to the initial revised memory allocation.

In yet other embodiments, the memory resizing recommendation system 340 may identify memory usage values indicative of non-constrained memory usage. For example, the memory resizing recommendation system 340 may analyze the historical memory usage profiles of active memory usage and identify those values when the active memory usage of the virtual machine was below (or below by a specific threshold) the memory allocated to that virtual machine at that time. The memory resizing recommendation system 340 may compare such values with the initial revised memory allocation and add at least a fraction of those values to the initial revised memory allocation if the initial revised memory allocation is less than those values.

Thus, at the operation 625, the memory resizing recommendation system 340 adjusts the initial revised memory allocation based upon the historical memory usage and computes the final revised memory allocation for a future period of time. Upon determining the final revised memory usage values, the memory resizing recommendation system 340 outputs those values at operation 630. In some embodiments, the output may be sent to the management system 315. In other embodiments, the memory resizing recommendation system 340 may itself be configured to update the memory allocation. The process 600 ends at operation 635.

Additionally, the memory resizing recommendation system 340 may be configured to run the processes 500 and 600 on one virtual machine at a time, on all of the virtual machines simultaneously, or on a subset of virtual machines at a time. In some embodiments, the memory resizing recommendation system 340 may run the processes 500 and 600 on one or some virtual machines to first identify any adverse impacts on those or the other virtual machines in the cluster from the adjusted memory allocation values before the other virtual machines are analyzed for adjustment.

Further, although the process 600 has been described as being performed in cases of a constrained memory, in some embodiments, the process 600 may also be performed in cases of not constrained memory. Specifically, when the process 600 is performed for a constrained memory situation, the virtual machine being analyzed uses more memory than allocated, so the process 600 determines the additional amount of memory to allocate to that virtual machine. Thus, the final revised memory allocation is greater than the initial memory allocation in a constrained memory case. When the process 600 is performed for a not constrained memory, the virtual machine being analyzed has more memory than it uses, and the process 600 determines how much extra memory the virtual machine has that may be taken away from that virtual machine. Thus, in a not constrained memory case, the final revised memory allocation is less than the initial memory allocation. The analysis for the not constrained case is same as outlined above in the process 600.

Figure 7:
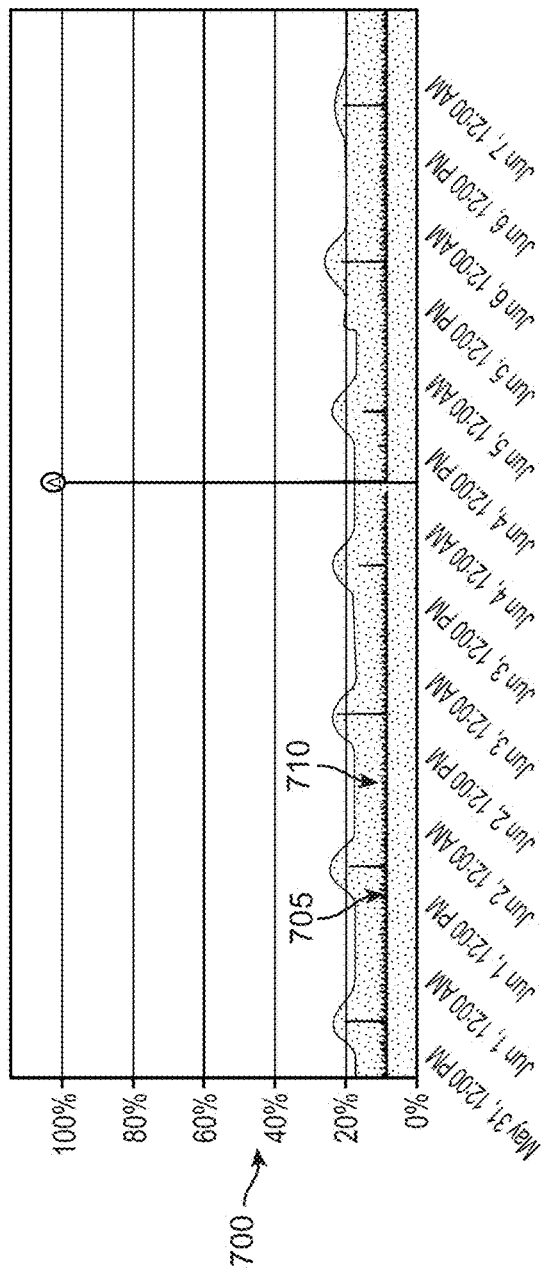
FIG. 7 is an example screenshot showing a historical memory usage profile, in accordance with some embodiments of the present disclosure.
Figure 8:
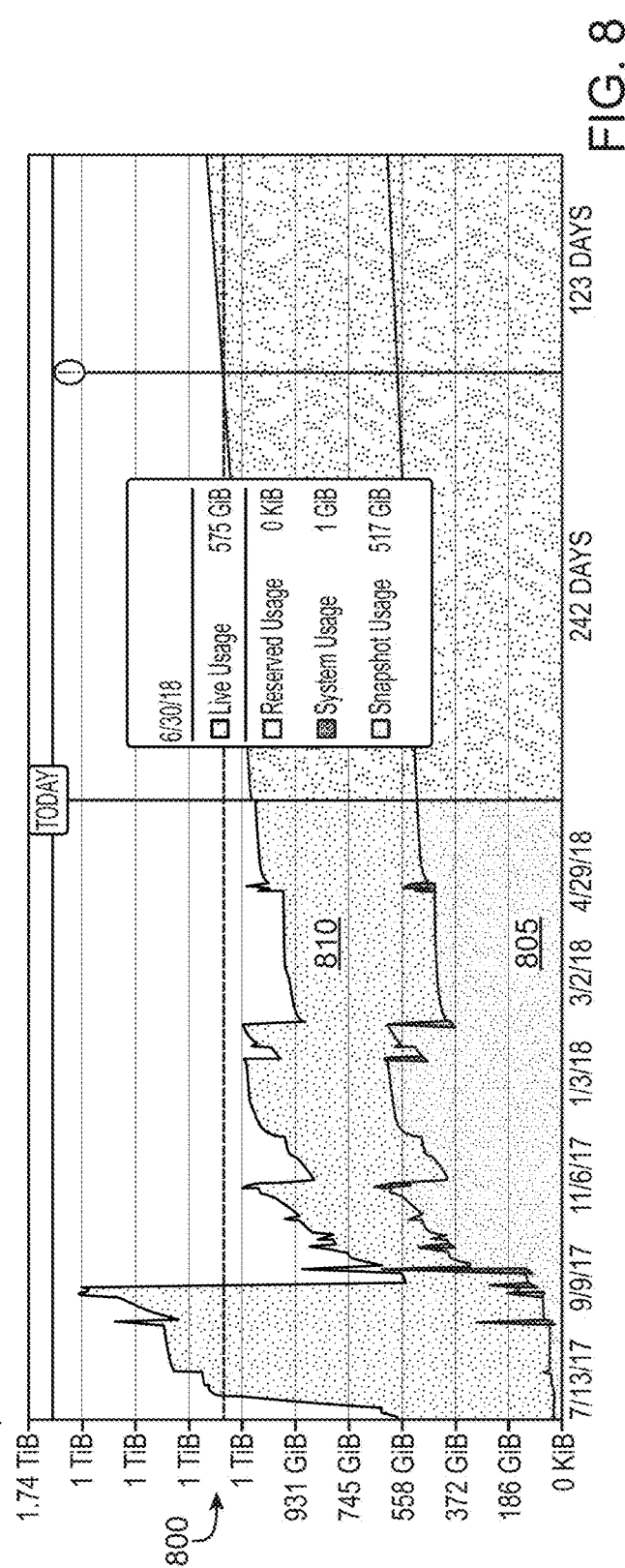
FIG. 8 is another example screenshot showing a portion of a predicted memory usage profile, in accordance with some embodiments of the present disclosure.

Referring now to FIGS. 7 and 8, example screenshots of memory usage profiles are shown, in accordance with at least some embodiments of the present disclosure. Specifically, FIG. 7 shows an example screenshot 700 of a historical memory usage profile, while FIG. 8 shows an example screenshot 800 of a predicted future memory usage profile. The screenshot 700 shows actual memory usage values 705 mapped using time series modeling for a period of time based on a twelve hour period. Band 710 shows the upper baseline and the lower baseline. The screenshot 800 shows a predicted future memory usage 805 and the final revised memory allocation 810.

It is to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   generating, by a memory resizing system, a current memory usage profile for a virtual machine by mapping memory usage information of the virtual machine as a function of time, wherein the memory usage information is collected from a counter associated with the virtual machine, wherein the current memory usage profile is determined from a first past predetermined time period,
   computing, by the memory resizing system, an upper baseline based upon a peak memory usage in the current memory usage profile;
   updating, by the memory resizing system, an initial memory allocation of the virtual machine based upon the upper baseline and a predetermined threshold for obtaining an initial revised memory allocation;
   updating, by the memory resizing system, the initial revised memory allocation based upon a moving average of memory usage for obtaining a final revised memory allocation;
   determining the moving average of memory usage from a second past predetermined time period; and
   determining the current memory usage profile from the second past determined time period, wherein the first past predetermined time period is greater than the second past predetermined time period.

2. The method of claim 1, further comprising determining, a lower baseline from the current memory usage profile for memory ballooning.

3. The method of claim 1, wherein determining the moving average of memory usage from the second past predetermined time period of the virtual machine is based on a historical memory usage profile.

4. The method of claim 1, further comprising updating the initial memory allocation of the virtual machine with the final revised memory allocation.

5. The method of claim 1, wherein the initial revised memory allocation and the final revised memory allocation are based on an amount of random access memory allocated to the virtual machine.

6. The method of claim 1, further comprising determining that the virtual machine is constrained for memory based upon the upper baseline being equal to or exceeding the initial memory allocation.

7. The method of claim 1, further comprising determining that the virtual machine is not constrained for memory based upon the upper baseline being less than the initial memory allocation.

8. The method of claim 1, further comprising revising the final revised memory allocation periodically based upon a predetermined period.

9. The method of claim 1, further comprising updating the final revised memory allocation using future memory usage profiles.

10. The method of claim 1, further comprising predicting future memory usage profiles based on past memory consumption patterns.

11. The method of claim 10, further comprising updating the final revised memory allocation using future memory usage profiles.

12. A method comprising:
generating, by a memory resizing system, a current memory usage profile for a virtual machine, wherein the current memory usage profile is determined from a first past predetermined time period,
computing, by the memory resizing system, an upper baseline based upon a peak memory usage in the current memory usage profile;
updating, by the memory resizing system, an initial memory allocation of the virtual machine based upon the upper baseline and a predetermined threshold for obtaining an initial revised memory allocation;
updating, by the memory resizing system, the initial revised memory allocation based upon a moving average of memory usage for obtaining a final revised memory allocation, wherein an agent of the memory resizing system collects memory usage information from a counter within a guest operating system of the virtual machine for generating the current memory usage profile;
determining the moving average of memory usage from a second past predetermined time period; and
determining the current memory usage profile from the second past determined time period, wherein the first past predetermined time period is greater than the second past predetermined time period.

13. The method of claim 12, further comprising updating the initial memory allocation of the virtual machine with the final revised memory allocation.

14. A method comprising:
generating, by a memory resizing system, a current memory usage profile for a virtual machine by plotting memory usage information of the virtual machine as a function of time, wherein the function of time comprises equally spaced points in time, wherein the current memory usage profile is determined from a first past predetermined time period;
computing, by the memory resizing system, an upper baseline based upon a peak memory usage in the current memory usage profile;
updating, by the memory resizing system, an initial memory allocation of the virtual machine based upon the upper baseline and a predetermined threshold for obtaining an initial revised memory allocation;
updating, by the memory resizing system, the initial revised memory allocation based upon a moving average of memory usage for obtaining a final revised memory allocation;
determining the moving average of memory usage from a second past predetermined time period; and
determining the current memory usage profile from the second past determined time period, wherein the first past predetermined time period is greater than the second past predetermined time period.

15. The method of claim 14, wherein the initial revised memory allocation and the final revised memory allocation are based on an amount of random access memory allocated to the virtual machine.

16. A method comprising:
generating, by a memory resizing system, a current memory usage profile for a virtual machine, wherein the current memory usage profile is determined from a first past predetermined time period;
computing, by the memory resizing system, an upper baseline based upon a peak memory usage in the current memory usage profile;
updating, by the memory resizing system, an initial memory allocation of the virtual machine based upon the upper baseline and a predetermined threshold for obtaining an initial revised memory allocation;
adding the upper baseline to the predetermined threshold for obtaining the initial revised memory allocation;
updating, by the memory resizing system, the initial revised memory allocation based upon a moving average of memory usage for obtaining a final revised memory allocation;
determining the moving average of memory usage from a second past predetermined time period; and
determining the current memory usage profile from the second past determined time period, wherein the first past predetermined time period is greater than the second past predetermined time period.

17. The method of claim 16, further comprising determining that the virtual machine is constrained for memory based upon the upper baseline being equal to or exceeding the initial memory allocation.

18. The method of claim 16, further comprising determining that the virtual machine is not constrained for memory based upon the upper baseline being less than the initial memory allocation.

19. An apparatus comprising programmed instructions to:
dynamically adjust an initial memory allocation of a virtual machine by generating a current memory usage profile of the virtual machine by mapping memory usage information of the virtual machine as a function of time, wherein the memory usage information is collected from a counter associated with the virtual machine, wherein the current memory usage profile is determined from a first past predetermined time period;
computing an upper baseline based upon a peak memory usage in the current memory profile;

updating the initial memory allocation of the virtual machine based upon the upper baseline and a predetermined threshold for obtaining an initial revised memory allocation;

updating the initial revised memory allocation based upon a moving average of memory usage for obtaining a final revised memory allocation;

determining the moving average of memory usage from a second past predetermined time period; and determining the current memory usage profile from the second past determined time period, wherein the first past predetermined time period is greater that the second past predetermined time period.

20. The apparatus of claim 19, wherein determining the moving average of memory usage from the second past predetermined time period of the virtual machine is based on a historical memory usage profile.

21. The apparatus of claim 19, further comprising programmed instructions for determining that the virtual machine is constrained for memory based upon the upper baseline being equal to or exceeding the initial memory allocation.

22. The apparatus of claim 19, further comprising programmed instructions for revising the final revised memory allocation periodically based upon a predetermined period.

23. The apparatus of claim 19, further comprising programmed instructions for predicting future memory usage profiles based on past memory consumption patterns.

24. The apparatus of claim 19, further comprising programmed instructions for updating the final revised memory allocation using future memory usage profiles.

25. A non-transitory computer readable media with computer-executable instructions embodied thereon that, when executed by a processor of a memory resizing system, cause the memory resizing system to perform a process comprising:

generating a current memory usage profile for a virtual machine by mapping memory usage information of the virtual machine as a function of time, wherein the memory usage information is collected from a counter associated with the virtual machine, wherein the current memory usage profile is determined from a first past predetermined time period;

computing an upper baseline based upon a peak memory usage in the current memory usage profile;

updating an initial memory allocation of the virtual machine based upon the upper baseline and a predetermined threshold for obtaining an initial revised memory allocation;

updating the initial revised memory allocation based upon a moving average of memory usage for obtaining a final revised memory allocation;

determining the moving average of memory usage from a second past predetermined time period; and determining the current memory usage profile from the second past predetermined time period, wherein the first past predetermined time period is greater than the second past predetermined time period.

26. The non-transitory computer readable media of claim 25, wherein the processor is further configured to output the final revised memory allocation to a management system for updating the initial memory allocation with the final revised memory allocation.

27. The non-transitory computer readable media of claim 25, wherein determining the moving average of memory usage is based on a historical memory usage profile of the virtual machine.

28. The non-transitory computer readable media of claim 25, wherein the process further comprises predicting future memory usage profiles based on past memory consumption patterns.

29. The non-transitory computer readable media of claim 28, wherein the process further comprises updating the final revised memory allocation using future memory usage profiles.

* * * * *